United States Patent [19]

Raymond

[11] Patent Number: 4,969,211

[45] Date of Patent: Nov. 6, 1990

[54] TRANSCEIVER INTERFERENCE CANCELLATION SYSTEM

[75] Inventor: Gerald Raymond, Hampshire, England

[73] Assignee: Plessey Overseas Limited, Ilford, England

[21] Appl. No.: 150,409

[22] PCT Filed: May 15, 1986

[86] PCT No.: PCT/GB86/00273
§ 371 Date: Mar. 15, 1988
§ 102(e) Date: Mar. 15, 1988

[87] PCT Pub. No.: WO87/07102
PCT Pub. Date: Nov. 19, 1987

[30] Foreign Application Priority Data
May 13, 1985 [GB] United Kingdom ............... 8512079

[51] Int. Cl.⁵ .................................... H04B 1/06
[52] U.S. Cl. ........................... 455/277; 455/278; 375/34; 342/383
[58] Field of Search ............. 455/276, 277, 278; 375/34; 342/383, 384

[56] References Cited

U.S. PATENT DOCUMENTS

| | | | |
|---|---|---|---|
| 4,047,151 | 9/1977 | Rydbeck et al. | 375/34 |
| 4,214,244 | 7/1980 | McKay et al. | 342/383 |
| 4,227,249 | 10/1980 | Hansen | 375/34 |
| 4,291,405 | 9/1981 | Jayant et al. | 375/34 |
| 4,365,338 | 12/1982 | McRae et al. | 375/34 |

Primary Examiner—Joseph A. Orsino
Assistant Examiner—Frank M. Scutch, III
Attorney, Agent, or Firm—Fleit, Jacobson, Cohn, Price, Holman & Stern

[57] ABSTRACT

A transceiver interference cancellation system having an adaptive processor for receiving signals from a number of antennas and for suppressing particular signals from the antennas. The system includes a code generator which controls a switch to provide transmitted signals with a predetermined pulse code. Means including a code correlator are provided for detecting the pulse code in received signals and for controlling the operation of the adaptive processor such that wanted signals when identified are not suppressed.

9 Claims, 2 Drawing Sheets

TRANSCEIVER INTERFERENCE CANCELLATION SYSTEM

BACKGROUND TO INVENTION

The present invention relates to a transceiver interference cancellation system (adaptive antenna) having an adaptive processor for receiving signals from a number of atennas and for suppressing particular signals received from the antennas.

Known transceiver interference cancellation systems employ adaptive processors which serve to automatically adjust the gain and phase conditions in the path between the antennas and the transceiver so as to cancel particular signals in the channel, but other particular signals pass through to the transceiver relatively unaffected.

Difficulties may arise with existing systems if the wanted and unwanted signals share a common frequency spectrum and the wanted signal is the dominant signal. In such instances there is a risk of accidental cancellation in the adaptive processor of the wanted signal reception. An objective of the present invention is to minimise that risk of accidental cancellation.

SUMMARY OF INVENTION

According to the present invention there is provided a transceiver interference cancellation system having an adaptive processor for receiving signals from a number of antennas and for suppressing particular signals received from the antennas wherein the improvement lies in the provision of a code generator for providing transmitted signals with a predetermined pulse code, a code correlator responsive to the code produced by the code generator and adapted to receive information for detecting a particular signal when it is the wanted signal as indicated by the presence therein of the pulse code, and an adaptive processor control means responsive to such detection by the code correlator for controlling operation of the adaptive processor such that wanted signals when identified are not suppressed, whereby interference only is cancelled.

In a preferred embodiment of the present invention there is provided first switch means whereby the code produced by the code generator can be applied to all wanted signal net transmissions.

In a further embodiment of the present invention second switch means is provided in the adaptive processor control means, the second switch means being operative in dependence upon a control signal from the code correlator indicating detection of the code in the received signal by the code correlator for controlling antenna pattern forming operation.

In a further embodiment of the present invention the adaptive processor control means comprises signal combiner means arranged to be switched into operation consequent upon detection of the code in the received signals for effecting in-phase combination of the signals received by the antennas, whereby the reception of the wanted signal is enhanced.

In the control process of an adaptive processor in a transceiver interference cancellation system in accordance with the present invention, there are two factors, either of which must be established in order to guarantee satisfactory operation. These are as follows:

(a) To exclude from the adaptive nulling control process, those signals which are required to be received, that is to say the wanted signals, and (b) To determine which of two types of signals wanted or unwanted are dominating the adaptive nulling control process.

The technique in accordance with the present invention is aimed at one or other of these two requirements depending on the manner of its implementation. The basis is as follows:

A wanted signal radio emission is interrupted, for short periodic intervals (windows), generally in a manner which is not detrimental to communications The interrupts can be regular or in an irregular sequence which is coded in some pre-defined manner. The adaptive array control process makes of these coded window sequences in the wanted signal transmission, in the following way:

(1) In the case of requirement (a) the signal environment is sampled during the window period and this information is used to control the adaptive array (in the absence of the wanted signals). In this case it is required that the adaptive array sampling operations are synchronised to the windows in the wanted signal emissions.

(2) In the case of requirement (b), the coded sequence of windows is used to identify certain signal conditions at either the adaptive array input or (and) the adaptive array output. Logical decisions can then be made to establish a suitable summation process for applying weighted element voltages to the communications receiver channel. In this case, it is required to identify the regular or coded window sequence at either the array input or the adapted output or both, by some form of signal detection.

A feature of the invention is to add into all radio net emissions a tag or signature which is reasonably secure, does not significantly affect communications and which can be used to control an interference cancellation process. This is provided without access to the internal processes of the transceiver, it must also avoid high power generation or dissipation. It forms part of the interference cancellation circuit providing both the application of the tag during transmission and the detection during reception.

In one embodiment of the present invention the tagging device is an RF power semi-conductor switch, placed in the radio transmission path. The tag takes the form of a repetitive sequence of short interruptions to the radio emission, at a nominal rate of 10 Hz. The precise time period between each interruption is jittered to a pre-defined code. This code defines the net signature.

In an embodiment of the present invention the time period for each digit of the code ranges from 80 to 120 ms and is quantised into eighty steps of 0.5 ms. The tag covers four or five such periods. The short interruption which defines the start and finish of each period or digit covers 0.2 to 0.5 ms. This represents a tag which is barely perceptible to normal operation.

The use of four or five digits per code is a compromise between code security and the interference cancellation circuit's step response time. The number of digits per code is dependent on trade-offs between length of code, code data rate, effect on communication and interference cancellation circuit response time as an initial step in the evaluation programme.

In the receive mode, the code is used to assess the detectability of the wanted signal emission. This is carried out by applying a form of envelope detection, based on adaptive threshold detection. The detected output, possibly containing the repetitive pulse time sequence, is correlated with the net code format. The correlation criterion is then used in one of two alternative ways, covering the two options previously specified.

In one embodiment the envelope and adaptive threshold detectors are coupled to the interference cancellation circuit's auxiliary receiver and to the data correlator. This determines whether the uncancelled input to the adaptive processor is predominantly the wanted or the unwanted signal. Since the adaptive processor responds to the strongest input signal, thereby placing a gain null in the array pattern onto that particular signal, one can provide the logical operations set out below.

Detection of the net data code will indicate that the adaptive processor has formed a null onto the wanted signal and hence the data correlator output will command the array sum pattern to be connected to the transceiver. If data correlation is not detected, then the interference is predominant and thereby controls the antenna gain null. Hence, the array difference pattern is switched to the transceiver.

BRIEF DESCRIPTION OF DRAWINGS

The present invention will be described further, by way of examples, with reference to the accompanying drawings in which.

SPECIFIC DESCRIPTION OF DRAWINGS

Figure 1:
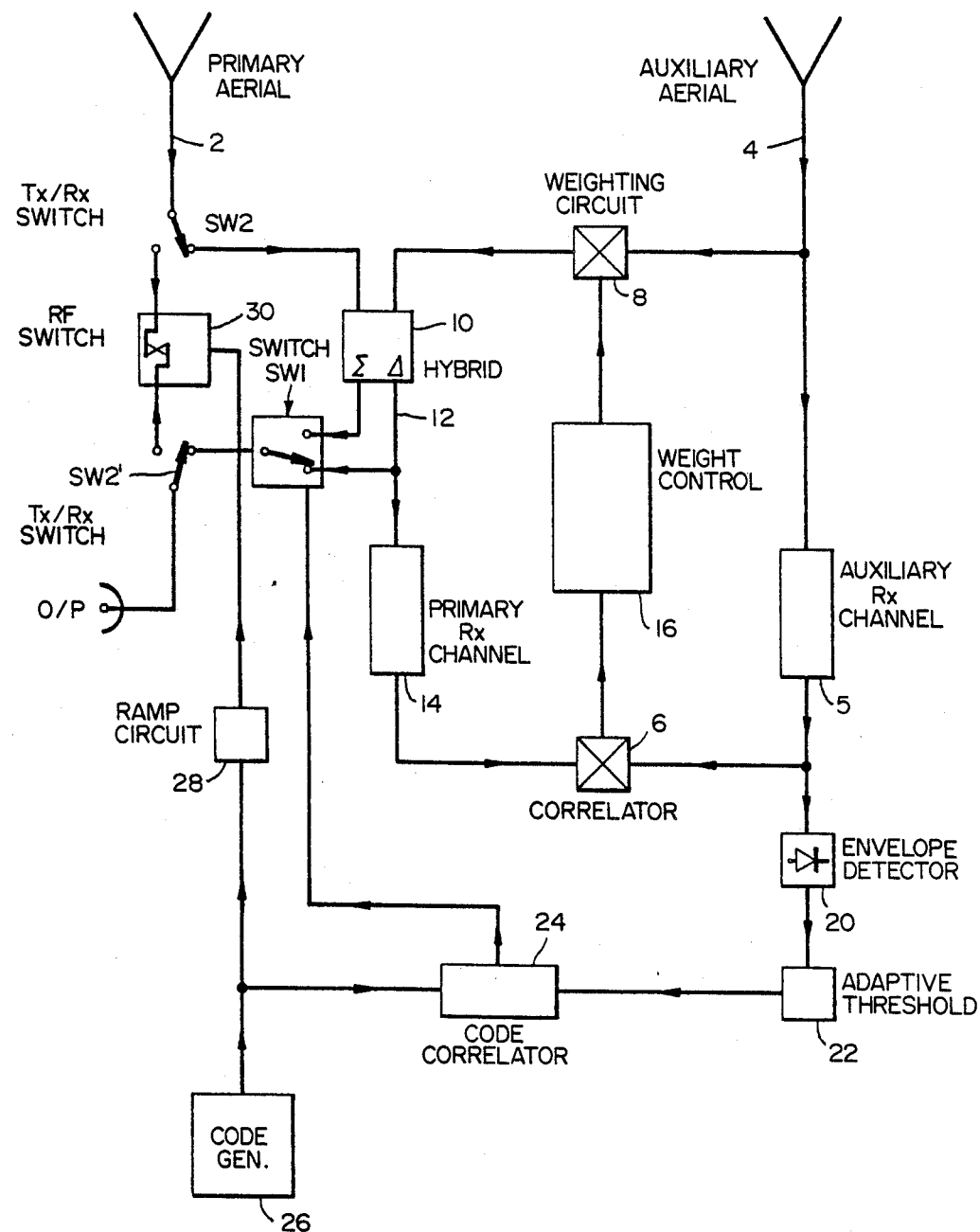
FIG. 1 is a schematic block diagram of a transceiver interference cancellating system in accordance with an embodiment of the present invention.

Referring to FIG. 1 a primary receiver aerial 2 and an auxiliary receiver aerial 4 are coupled to an interference cancellation circuit which differentially weights and combines the signals from the aerials 2, 4 so as to suppress any particular signal.

Each of the r.f. signals receives by the aerials 2,4 may consist of a wanted signal S and an interference signal I both at a tuned frequency. The signal received by the auxiliary aerial 4 feeds an auxiliary receiver channel 5 comprising a mixer (not shown) which is fed from a local oscillator (not shown). The intermediate frequency from the mixer is fed via an amplifier (not shown) to a first input of a correlator circuit 6. The r.f. signal received by the auxiliary aerial 4 is also fed to a first input of a weighting circuit 8.

The r.f. signal from the primary aerial 2 is fed via a transmitter/receiver switch SW2 to a first input of a hybrid T-junction 10 the second input of which is connected to the output of the weighting circuit 8. One of the outputs of the hybrid T-junction 10 is fed via a line 12, a switch SW1 and a second transmitter/receiver switch SW2 to an output terminal O/P of the interference cancellation circuit to which output is coupled the transceiver. The output along the line 12 is also connected to a primary receiver channel 14 the output of which is fed to a second input of the correlator circuit 6. The nature of the input signals to the correlator circuit 6 is dependent on the method used for discriminating between the wanted and unwanted signals, the method used being arranged so that the input signals are predominently interference. The correlator circuit 6 comprises an arrangement of splitters and phase detectors and their function in providing an output signal dependent on the interference signal I is well known in the electronic field and so will not be described in detail herein. The output signal of correlator circuit 6 is fed via a weight control circuit 16 to a second input of the weighting circuit 8.

The weighting circuit 8 serves as a vector modulator to weight the signal received at its first input by the signal received at its second input. The weighting adjusts the signal received at the first input in both phase and amplitude to give an output signal from the weighting circuit 8 which when fed as the signal to the second input of the hybrid T-junction 10, suppresses the particular component of the output signal from the hydrid T-junction 10. The weighting circuit 8 and the weight control 16 comprise arrangements well known in the electronic field and so will not be described in detail herein.

The hybrid T-junction 10, the correlator 6, the weighting circuit 8 and the weight control 16 together define a negative feedback loop which suppresses the component of the interference signal included in the output signal transmitted from the output terminal O/P.

The output from the auxiliary receiver channel 5 is fed via an envelope detector circuit 20 to an adaptive threshold circuit 22. The output from the adaptive threshold circuit 22 is connected to an input of a code correlator 24 the second input of which is connected to the output from a code generator 26. The code generator 26 is coupled by a ramp circuit 28 to an RF power switch 30. The output of the code correlator 24 supplies control signals to operate the switch SW1, the control signals being provided upon detection of the code in the received signal by the code correlator 24.

Figure 2:
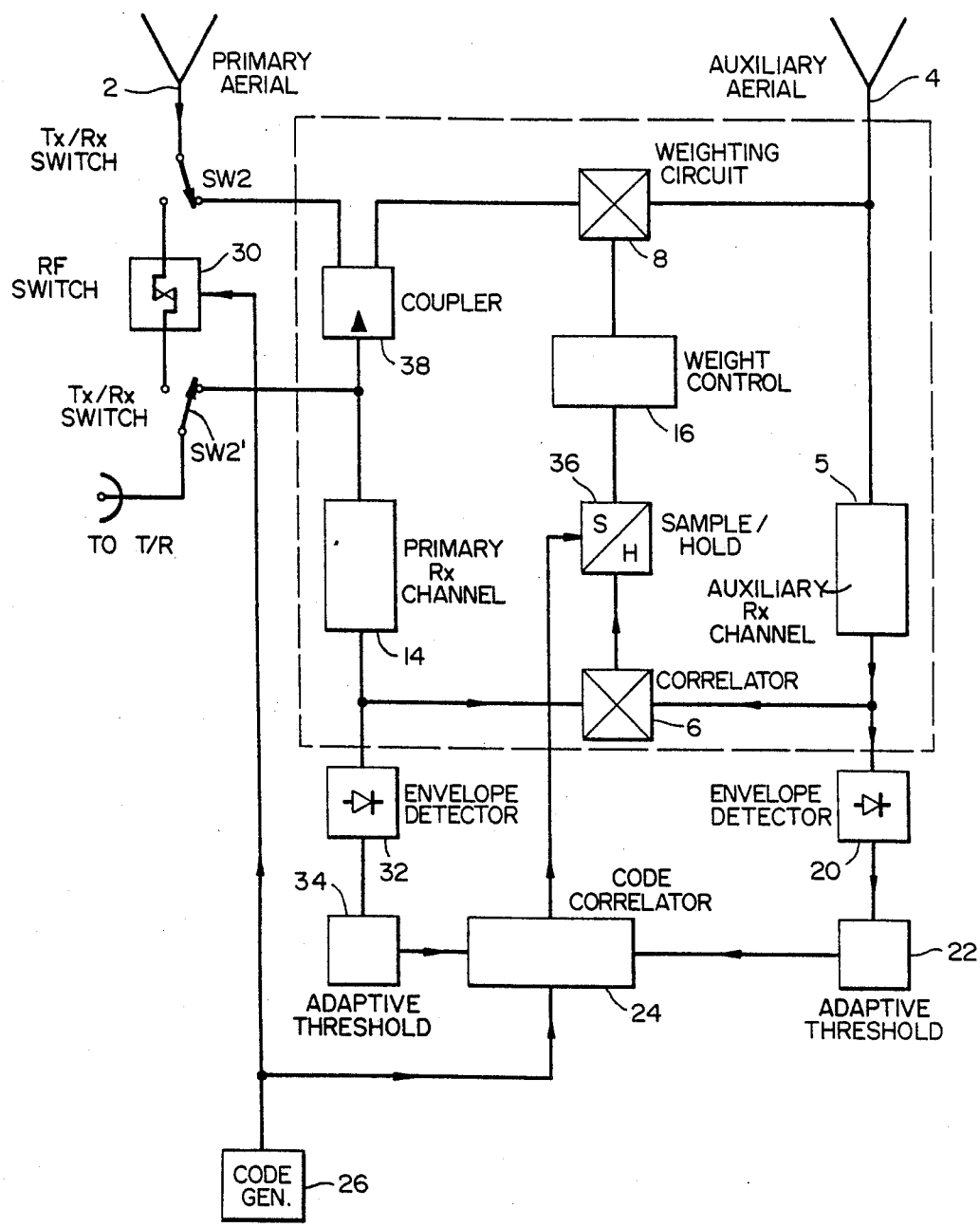
FIG. 2 is a schematic block diagram of a transceiver interference cancellation system in accordance with a further embodiment of the present invention.

An alternative to the embodiment of FIG. 1 is illustrated in FIG. 2 in which features common to FIG. 1 have been represented by the same numerals. Referring to FIG. 2 the output of the primary receiver channel 14 is connected to an input of a further envelope detector circuit 32 the output of which is connected to a further adaptive threshold circuit 34. The output of the adaptive threshold circuit 34 is connected to an input of the code correlator 24. The output of the code correlator 24 is connected to a control input of a sample/hold circuit 36. The embodiment in FIG. 2 operates on the basis of sampling the interference in the absence of the wanted signal. In this system, both the cancelled and the uncancelled receiver channels are correlated against the net data code. Both are used simultaneously to find correlation and hence time synchronisation over the first four digits of a five digit code. The interruption at the end of the fifth digit is then anticipated, to provide a sampling window through which the jamming can be sampled. The processor then operates on a sample and hold basis. The array difference pattern is then always connected to the transceiver via a coupler 38.

This approach represents a slower response than in the previous embodiment, because the processor is only operating in small sample windows. In the absence of net code detection the processor carries out repetitive sampling.

Hence, the signature technique offers two alternative methods of controlling the adaptive array. In the first embodiment one decides which signal is controlling the processor and appropriately use either the sum or the difference array pattern. In the second embodiment, one finds the wanted signal code time, by correlating four data time periods and then use the fifth data window to sample the jamming for adaptive array control.

Although the present invention has been described with respect to two particular embodiments, it should be understood that modifications may be effected within the scope of the invention.

I claim:

1. A transceiver interference cancellation system which is adapted to receive signals for application to a transceiver and to transmit signals afforded by said transceiver, said system comprising first and second antennas, code generator means, coding means operable in accordance with a code from said code generator means for coding a signal afforded by said transceiver prior to its transmission by one of said first and second antennas, an adaptive processor which includes a weighting circuit for weighting a received signal from said first antenna and a combining circuit for combining said weighted signal with a received signal from said second antenna for affording a processed signal for application to said transceiver, detector means for detecting the coding of a received signal from one of said antennas, and code correlator means for correlating the output of said detector means with the code generated by said code generator for controlling said adaptive processor such that received signals not having said coding are suppressed.

2. A transceiver interference cancellation system as claimed in claim 1 wherein the coding means comprises a switch means for switching the signals afforded by said transceiver in accordance with said code from said code generator.

3. A transceiver interference cancellation system as claimed in claim 1 wherein said detector means includes envelope and adaptive threshold detector circuits.

4. A transceiver interference cancellation system as claimed in claim 2 wherein the switch means is in the form of an RF power semiconductor switch.

5. A transceiver interference cancellation system which is adapted to receive signals for application to a transceiver and to transmit signals afforded by said transceiver, said system comprising first and second antennas, code generator means, coding means operable in accordance with a code from said code generator means for coding a signal afforded by said transceiver prior to its transmission by one of said first and second antennas, an adaptive processor comprising a weighting circuit for weighting a received signal from said first antenna, and a combining circuit for combining said weighted signal with a received signal from said second antenna for affording said processed signal, said adaptive processor operable on received signals from the first and second antennas for affording said processed signal for application to said transceiver, detector means including envelope and adaptive threshold detector circuits for detecting the coding of a received signal from one of said antennas, and code correlation means for correlating the output of said detector means with the code generated by said code generator for controlling said adaptive processor such that received signals not having said coding are suppressed.

6. A transceiver interference cancellation system as claimed in claim 5 wherein said combiner circuit is effective for affording a subtractively combined signal and an additively combined signal, and wherein said adaptive processor comprises switch means for switching between one or other of said combined signals under the control of an output from said code correlator means for affording said processed signal.

7. A transceiver interference cancellation system as claimed in claim 5 wherein said combiner circuit is effective for affording a subtractively combined signal.

8. A transceiver interference cancellation system as claimed in claim 7 wherein said adaptive processor comprises a first receiver channel connected to the output of said combiner, a second receiver channel operable on the received signal from said first antenna, a further correlator operable on the outputs from said first and second receiver channels, and a sample/hold circuit connected to the output of said further correlator and for affording and output for controlling said weighting circuit.

9. A transceiver interference cancellation system as claimed in claim 8, wherein said adaptive processor comprises further envelope and adaptive threshold circuits connected to the output of said first receiver channel, said code correlator being effective for correlating the outputs of said envelope and adaptive threshold circuits and said further envelope and adaptive threshold circuits under the control of said code generator and for generating an output for application to said sample/hold circuit.

* * * * *